Dec. 22, 1942. G. K. MULHOLLAND 2,306,179
CASTER UNIT
Filed Dec. 13, 1940  2 Sheets-Sheet 1

INVENTOR
George K. Mulholland.
BY
Frank C. Korman.

Dec. 22, 1942.   G. K. MULHOLLAND   2,306,179
CASTER UNIT
Filed Dec. 13, 1940   2 Sheets-Sheet 2

INVENTOR
George K. Mulholland.
BY
Frank C. Fearman.

Patented Dec. 22, 1942

2,306,179

UNITED STATES PATENT OFFICE 2,306,179

CASTER UNIT

George K. Mulholland, Saginaw, Mich.

Application December 13, 1940, Serial No. 369,945

2 Claims. (Cl. 16—35)

This invention relates to caster units for vehicles, factory trucks, and similar appliances, and especially to a dampener for dampening the swiveling action of the unit as it is drawn over the floor or highway.

One of the prime objects of the invention is to design a free swiveling caster unit dampener which eliminates "shimmy," thus insuring accurate tracking with the power vehicle.

Another object is to provide an inexpensive caster unit dampener including means for adjusting the braking pressure of said dampening means.

A further object is to provide a very simple, practical, and effective dampening mechanism which can be readily manufactured and assembled, and which can be easily applied and adjusted.

A further object still is to provide a dampener mechanism composed of few parts, all of simple construction, and which in no manner interferes with the normal operation of the caster unit.

The invention will be best understood from a consideration of the following detailed description in view of the accompanying drawings forming a part of the specification. Nevertheless, it is to be understood that the invention is not confined to the disclosure, being susceptible to such changes and modifications as define no material departure from the salient features of the invention as expressed in the appended claims.

In the drawings:

Fig. 4 is a side elevational view of a vehicle showing caster unit in position on a vehicle.

Figure 1:
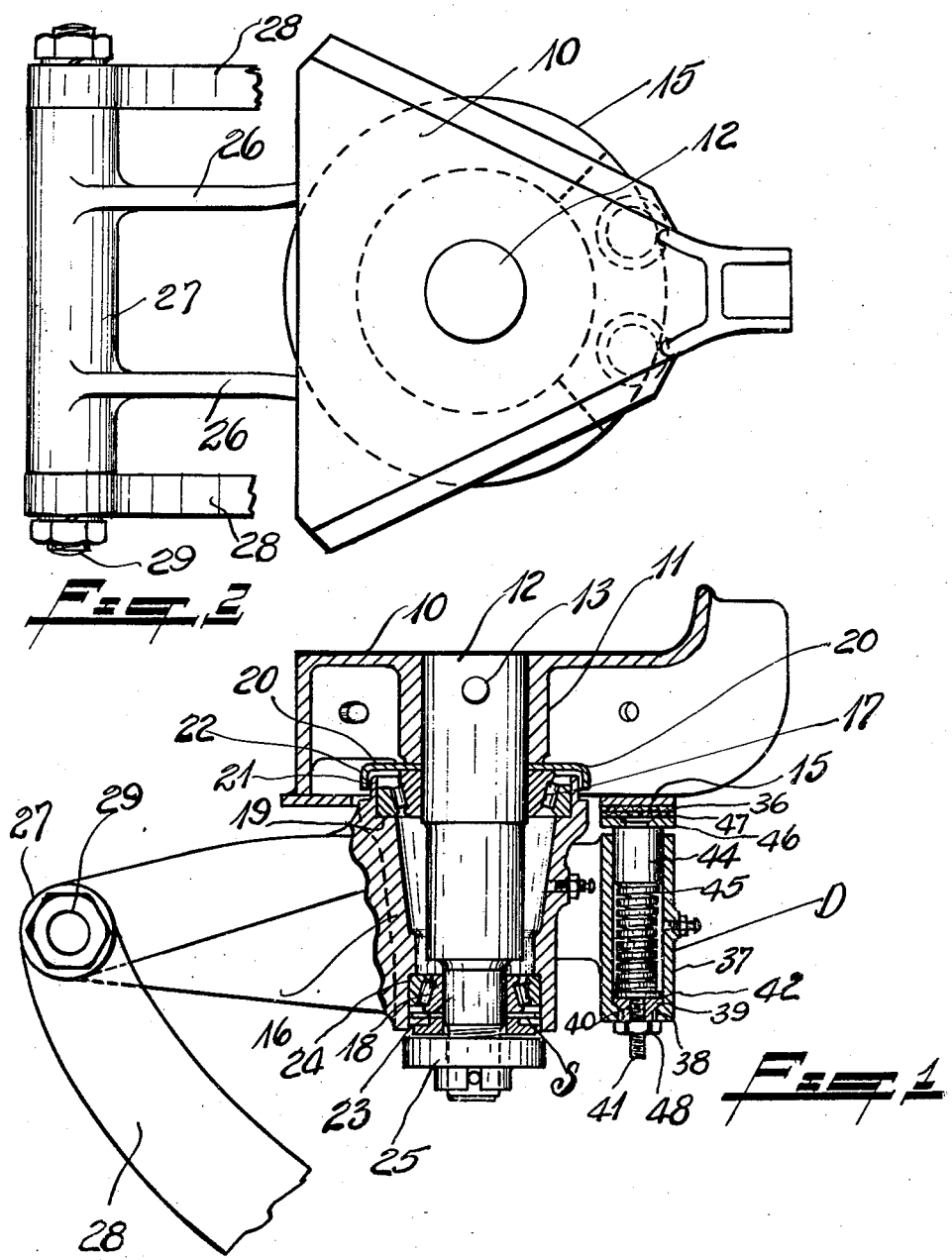
Fig. 1 is a fragmentary, sectional side elevational view of a caster unit showing my dampening means in position thereon, the wheel assembly being omitted.
Figure 2:
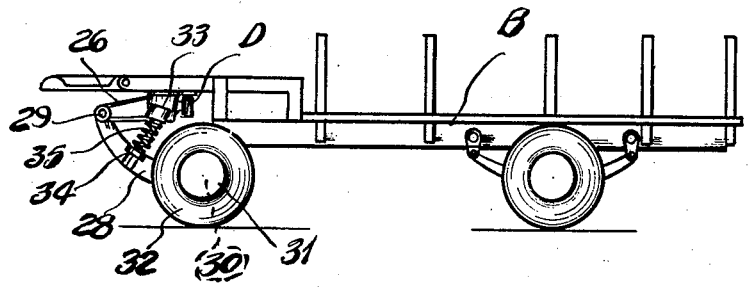
Fig. 2 is a top plan view.
Figure 3:
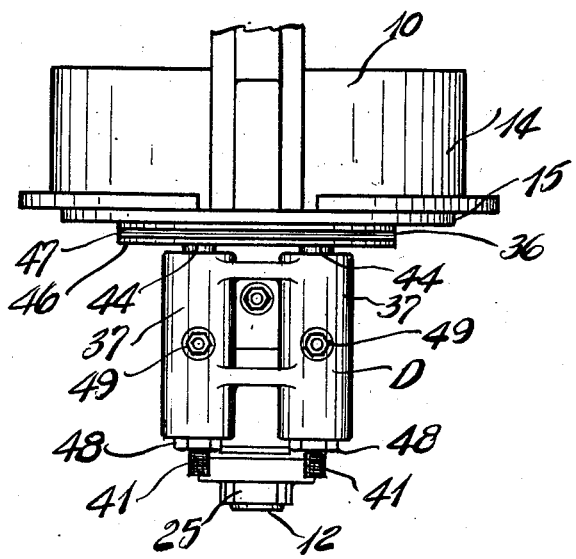
Fig. 3 is a rear view of the mechanism shown in Figs. 1 and 2.

The present invention is adaptable to any form of swiveling caster unit, and as a disclosure of one form of such device, reference is invited to my application for "Trailer units," Serial No. 312,887, filed January 8, 1940.

Referring now more particularly to the drawings, and by reference characters. The number 10 designates a bracket of any desired shape or design. This bracket is shown of triangular shape and is rigidly bolted or otherwise secured to the vehicle frame or body B as illustrated in Fig. 4 of the drawings.

A centrally disposed hub 11 is cast integral with the bracket 10 and a vertically disposed center stem 12 extends into said hub and is secured thereto by means of a pin 13 as usual. Downwardly turned flanges 14 are cast integral with the bracket 10, and a bottom brake plate 15 is welded to the lower edges of the flange as shown.

A hub member 16 is revolvably mounted on the stem 11, and includes anti-friction roller bearing assemblies 17 and 18 respectively, the upper end of the hub being shouldered as at 19, to accommodate the bearing assembly 17, and a cover plate 20 is interposed between the end of the hub and the bearing to form a seal and exclude dust and other foreign matter, the upper edge of the hub being shouldered as at 21 to accommodate the turned edge 22 of the cover.

The lower end of the stem 12 is shouldered as at 23 to accommodate the lower bearing 18, and the hub 16 is also shouldered as at 24 and for the same purpose, a grease seal S being provided in the hub below said bearing, and the end of the stem 12 is threaded to accommodate a nut 25 in the conventional manner.

Forwardly projecting, downwardly curved arms 26 are cast integral with the hub 16, said arms terminating in a horizontally disposed bearing 27 to which the forked member 28 is pivotally connected by means of a hinge pin 29, the opposite ends of said fork leading rearwardly and terminating in an axle assembly 30 on which one or more wheels 31 are mounted, and which are provided with pneumatic tires 32 as usual.

Spring cups or seats 33 and 34 respectively, are provided on said arm and fork, and springs 35 are interposed between said seats to permit the structure to raise and lower with relation to the wheel as the spring is flexed.

The dampening means is indicated at D and includes the circular brake plate 15 welded or otherwise secured to the bracket 10 and on which a strip of brake lining 36 is secured in any approved manner. Tubular members 37 are cast integral with the hub member 16 and an opening 38 is provided in the lower end thereof, a shouldered plug 39 being mounted in the lower end of the tubular member, and extends into said opening, said plug being provided with a centrally disposed threaded opening 40 in which the bolt 41 is threaded. A washer 42 is mounted on the plug 39 and is adjustable vertically therein by means of the bolt 41.

A plug 44 is loosely mounted in the upper end of the tubular member 37 and a spring 45 is interposed between said plug and washer 42, the upper end of the plug being shouldered as shown, and a circular brake shoe 46 is riveted or otherwise secured thereon, a brake lining 47 being secured to the face of said shoe and engages the brake lining 36 provided on the brake plate 15. A nut 48 is threaded on the end of the bolt 41 and the end of the bolt is recessed to accommodate a conventional socket wrench (not shown), so that the nut 48 can be backed off or on prior to manipulation of the bolt 41 to raise the washer 42 compressing the spring 45 and thus providing for additional pressure of the brake shoe 46 against the brake surface 36.

Due to the fact that the caster unit ofttimes travels over rough and uneven roads, I find it desirable to provide a sloppy fit for the plug 44 in the member 37, thus insuring the necessary limited movement without excessive dampening.

Grease fittings or connections 49 are provided in the hub 16 to provide for proper lubrication and similar fittings 50 are provided in the members 37 and for the same purpose.

From the foregoing description, it will be obvious that I have perfected a very simple, substantial, and practical dampening mechanism for caster units and the like.

What I claim is:

1. A caster unit of the class described and including a bracket adapted to be secured to a vehicle frame; a brake element on said bracket; a stem secured to said bracket; a hub revolvably mounted on said stem; offset hollow tubular members mounted on the hub, spring pressed plugs mounted in the tubular members, a brake shoe mounted on said plugs and engageable with said brake element; and means for adjusting the pressure on said plugs.

2. A caster unit of the character described including a bracket adapted to be rigidly secured to a vehicle frame; a brake strip on said bracket; a vertically disposed stem mounted in the bracket; a hub revolvably mounted on said stem; offset, hollow tubular members on the hub, vertically movable plugs in said tubular members, and a brake shoe secured thereto and resilient means normally urging said brake shoe into facial contact with said brake strip; and adjustable means cooperating with said resilient means for adjusting the pressure of said brake element against said brake strip.

GEORGE K. MULHOLLAND.